US007755676B2

(12) United States Patent
Ishibashi (10) Patent No.: US 7,755,676 B2
(45) Date of Patent: Jul. 13, 2010

(54) MULTI-BAND IMAGE PHOTOGRAPHING METHOD AND APPARATUS, AND PROGRAM FOR EXECUTING THE METHOD

(75) Inventor: Hideyasu Ishibashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1578 days.

(21) Appl. No.: 10/652,556

(22) Filed: Sep. 2, 2003

(65) Prior Publication Data

US 2005/0099513 A1    May 12, 2005

(30) Foreign Application Priority Data

Aug. 30, 2002  (JP)  ............... 2002-252887

(51) Int. Cl.
H04N 9/68      (2006.01)
H04N 5/235     (2006.01)
(52) U.S. Cl. .................. 348/234; 348/222.1; 348/362
(58) Field of Classification Search .................. 348/324
See application file for complete search history.

(56) References Cited

U.S. PATENT DOCUMENTS 5,864,364 A * 1/1999 Ohyama et al. ......... 348/211.14
6,023,350 A * 2/2000 Nakao ..................... 358/512
6,466,334 B1 * 10/2002 Komiya et al. ............ 358/1.9
7,035,472 B2 * 4/2006 Nichogi et al. ............ 382/239
2002/0113880 A1 * 8/2002 Iida et al. .................. 348/222

FOREIGN PATENT DOCUMENTS

JP    2000350222 A    12/2000

OTHER PUBLICATIONS

JPO Action dated Jun. 10, 2008.

* cited by examiner

Primary Examiner—Luong T Nguyen
(74) Attorney, Agent, or Firm—Sughrue Mion, PLLC (57) ABSTRACT

The multi-band image photographing method and apparatus photograph a subject by dividing a photographing wavelength region into plural bands and obtain spectral images of the subject corresponding to the respective divided plural bands. The method and apparatus detect a sensitivity balance among the respective plural bands from photographing data of each of the spectral images obtained by preliminary photographing performed prior to main photographing, determine photographing conditions for the respective plural bands based upon the detected sensitivity balance, and perform the main photographing in accordance with the determined photographing conditions to photograph a multi-band image. The program is used to cause a computer to execute this method or part thereof.

12 Claims, 5 Drawing Sheets

MULTI-BAND IMAGE PHOTOGRAPHING METHOD AND APPARATUS, AND PROGRAM FOR EXECUTING THE METHOD

BACKGROUND OF THE INVENTION

1. Field of the Invention

The present invention relates to a multi-band image photographing method and apparatus, and a program for executing the method. In particular, the invention relates to a multi-band image photographing technique with which a multi-band image providing satisfactory noise balance to a reproduced image and contributing to reproduction of a natural image is obtained.

2. Description of the Related Art

In recent years, the progress of an image pickup technique is attaining commercialization of a multichannel photographing unit (multi-band camera), in particular, a photographing unit having plural channels (bands) that allow a spectral waveform of a subject to be restored with a practically sufficient accuracy. This is a camera with which a subject is photographed in plural wavelength regions (multi-band) that allow plural kinds (four or more kinds in many cases) of light to pass therethrough, thereby obtaining plural image data (spectral image data (multi-band image data) for each band (channel)). The camera is mainly constructed by, for example, a CCD and a color separation filter.

In the multi-band camera, reflected light obtained by illuminating a subject with illumination light having a specified (constant) spectral intensity distribution is allowed to pass through a spectral filter having a specified (constant) spectral transmittance distribution which is different for each band. The light is then focused on a light-receiving surface of an image pickup device via an optical lens of the camera having a specified spectral transmittance distribution, whereby a multi-band image having spectral images for respective plural bands is obtained.

Therefore, in the conventional multi-band camera, the sensitivity of each band is determined based on the product of the characteristics of spectral filters for respective plural bands and the spectral sensitivity distribution of an image pickup device.

That is, the effective exposure amount at the time of photographing with the multi-band camera is defined by the product of filtering characteristics of the spectral filters, that is, spectral transmittance distributions and a spectral intensity distribution of illumination light at the time of photographing. More precisely, the effective exposure amount is defined by including a spectral sensitivity distribution of the image pickup device in the product, and by further including a spectral transmittance distribution of the optical lens of the camera in the product.

However, deviation in these spectral characteristics may cause unbalance of the effective exposure amount for each band, and the dynamic range of a certain band may become narrow compared with those of other bands. As the result, there is a problem that an S/N ratio of the band decreases and data in the band is acquired as image data containing noise.

On the other hand, in the case where there is a deviation in the spectral distribution of a light source as exemplified by a fluorescent lamp, a deviation occurs in the intensity of the illumination light source in each band. As a result, image data obtained by photographing in a band having a low illumination light source intensity provides an image with lower S/N ratio than that in image data obtained by photographing in other bands. The effective exposure amount obtained by photographing in each band using a multi-band camera can be deemed to be given by a function of the "spectral sensitivity of a multi-band camera" corresponding to each band and the "spectral energy distribution of a light source" corresponding to each band. The amount of light obtained in each band and the S/N ratio has a functional relation in which the S/N ratio is improved together with the increase of the amount of light.

In this case, in a reproduced image obtained by compositing spectral images of the respective bands, noise or unevenness in a certain color becomes conspicuous, that is, decrease in image quality occurs.

An exemplary method of removing such noise includes a method in which a noise suppressing parameter is changed in accordance with the noise level by later image processing. However, there is a problem that such a method may cause differences in the artifact upon noise suppression if there are too large differences in the noise level and consequently lead to reproduction of an unnatural image.

SUMMARY OF THE INVENTION

The present invention has been devised in view of the above-mentioned conventional problems, and it is a first object of the present invention to provide a multi-band image photographing method which is capable of obtaining a multi-band image for natural image reproduction by allowing S/N ratios among photographing bands to fall within a predetermined range when obtaining the multi-band image so that a reproduced image can have a satisfactory noise balance.

A second object of the present invention is to provide a multi-band image photographing apparatus capable of implementing the multi-band image photographing method in the first object described above.

A third object of the present invention is to provide a program for executing the multi-band image photographing method in the first object described above.

In order to attain the first object described above, a first aspect of the present invention provides a multi-band image photographing method of photographing a subject by dividing a photographing wavelength region into plural bands and obtaining spectral images of the subject corresponding to the respective divided plural bands, comprising the steps of detecting a sensitivity balance among the respective plural bands from photographing data of each of the spectral images corresponding to the respective plural bands obtained by preliminary photographing which is performed prior to main photographing, determining photographing conditions for the respective plural bands based upon the detected sensitivity balance among the respective plural bands, and performing the main photographing in accordance with the determined photographing conditions for the respective plural bands.

And, in order to attain the first object described above, the first aspect of the present invention provides a multi-band image photographing method of photographing a subject by dividing a photographing wavelength region into plural bands and obtaining spectral images of the subject corresponding to the respective divided plural bands, comprising the steps of preparing in advance a conversion table that has a proportional relation between image output values of a photographed image and effective exposure amounts upon photographing, detecting an output value balance among the respective plural bands from photographing data of each of the spectral images corresponding to the respective plural bands obtained by preliminary photographing which is performed prior to main photographing, determining photographing conditions for the respective plural bands based upon the detected output value balance among the respective plural bands, performing the main photographing in accordance with the determined photographing conditions, and converting the obtained image output values into the effective exposure amounts using the conversion table and outputting the obtained effective exposure amounts.

Further, in order to attain the first object described above, the first aspect of the present invention provides a multi-band image photographing method of photographing a subject by dividing a photographing wavelength region into plural bands and obtaining spectral images of the subject corresponding to the respective divided plural bands, comprising the steps of detecting an output value balance among the respective plural bands from photographing data of each of the spectral images corresponding to the respective plural bands obtained by preliminary photographing which is performed prior to main photographing, determining photographing conditions for the respective plural bands based upon the detected output value balance among the respective plural bands, and performing the main photographing in accordance with the determined photographing conditions for the respective plural bands.

Preferably, in the multi-band image photographing methods accordingly to the first aspect of the present invention, as the photographing conditions, respective exposure times for adjusting exposure amounts are determined.

In order to attain the second object described above, a second aspect of the present invention provides a multi-band image photographing apparatus comprising photographing means for photographing a subject by dividing a photographing wavelength region into plural bands and obtaining spectral images of the subject corresponding to the respective divided plural bands, sensitivity balance detection means for detecting a sensitivity balance among the respective plural bands from photographing data for the respective plural bands obtained by the photographing means, and photographing condition determination means for determining photographing conditions based upon the sensitivity balance among the respective plural bands detected by the sensitivity balance detection means.

Preferably, the sensitivity balance among the respective plural bands is detected by the sensitivity balance detection means from the photographing data of the spectral images corresponding to the respective divided plural bands obtained by preliminary photographing which is performed by the photographing means prior to main photographing, the photographing conditions for the respective plural bands are determined by the photographing condition determination means based upon the detected sensitivity balance among the respective plural bands, and the main photographing is performed by the photographing means in accordance with the determined photographing conditions for the respective plural bands.

And, in order to attain the second object described above, the second aspect of the present invention provides a multi-band image photographing apparatus comprising photographing means for photographing a subject by dividing a photographing wavelength region into plural bands and obtaining spectral images of the subject corresponding to the respective divided plural bands, storage means for storing a conversion table prepared in advance so that image output values of a photographed image by the photographing means and effective exposure amounts upon photographing has a proportional relation, output value balance detection means for detecting an output value balance among the respective plural bands from photographing data of each of the spectral images corresponding to the respective plural bands obtained by preliminary photographing which is performed by the photographing means prior to main photographing, photographing condition determination means for determining photographing conditions based upon the detected output value balance among the respective plural bands, and conversion means for converting the image output values obtained by the photographing means through the main photographing based on the determined photographing conditions into the effective exposure amounts using the conversion table stored in the storage means.

Further, in order to attain the second object described above, the second aspect of the present invention provides a multi-band image photographing apparatus comprising photographing means for photographing a subject by dividing a photographing wavelength region into plural bands and obtaining spectral images of the subject corresponding to the respective divided plural bands, output value balance detection means for detecting an output value balance among the respective plural bands from photographing data of each of the spectral images corresponding to the respective plural bands obtained by preliminary photographing which is performed by the photographing means prior to main photographing, and photographing condition determination means for determining photographing conditions based upon the detected output value balance among the respective plural bands.

Preferably, in the multi-band image photographing apparatuses accordingly to the second aspect of the present invention, the photographing condition determination means determines respective exposure times for adjusting exposure amounts.

Now, in order to attain the third object described above, a third aspect of the present invention provides a program for executing, at least partially, each of the multi-band image photographing method of the above-described first aspect of the present invention by using a computer.

In other words, the third aspect of the present invention provides a program for causing a computer to execute a method of determining photographing conditions for respective plural bands in order to perform a multi-band image photographing method of photographing a subject by dividing a photographing wavelength region into the respective plural bands and obtaining spectral images of the subject corresponding to the respective divided plural bands, comprising the steps of calculating a sensitivity balance among the respective plural bands from photographing data of each of the spectral images corresponding to the respective plural bands obtained by preliminary photographing which is performed prior to main photographing, and determining the photographing conditions for the main photographing in the respective plural bands based upon the calculated sensitivity balance among the respective plural bands.

Also, the third aspect of the present invention provides a program for causing a computer to execute a method of determining photographing conditions for respective plural bands in order to perform a multi-band image photographing method of photographing a subject by dividing a photographing wavelength region into the respective plural bands and obtaining spectral images of the subject corresponding to the respective divided plural bands, comprising the steps of calculating an output value balance among the respective plural bands from photographing data of each of the spectral images corresponding to the respective plural bands obtained by preliminary photographing which is performed prior to main photographing, determining the photographing conditions for the respective plural bands based upon the calculated output value balance among the respective plural bands, and converting image output values obtained by the main photographing under the determined photographing conditions into effective exposure amounts using a conversion table prepared in advance so that the image output values of a photographed image and the effective exposure amounts upon photographing has a proportional relation, thereby outputting the thus obtained effective exposure amounts.

Furthermore, the third aspect of the present invention provides a program for causing a computer to execute a method of determining photographing conditions for respective plural bands in order to perform a multi-band image photographing method of photographing a subject by dividing a photographing wavelength region into the respective plural bands and obtaining spectral images of the subject corresponding to the respective divided plural bands, comprising the steps of calculating an output value balance among the respective plural bands from photographing data of each of the spectral images corresponding to the respective plural bands obtained by preliminary photographing which is performed prior to main photographing, and determining the photographing conditions for the main photographing in the respective plural bands based upon the calculated output value balance among the respective plural bands.

Preferably, in the programs according to the third aspect of the present invention, as the photographing conditions, exposure times for adjusting exposure amounts are determined.

Alternatively, the third aspect of the present invention may be a program for causing a computer that controls the multi-band image photographing apparatus to execute the multi-band image photographing method of photographing a subject by dividing a photographing wavelength region into plural bands and obtaining spectral images of the subject corresponding to the respective divided plural bands.

One of such programs comprises the steps of calculating a sensitivity balance among the respective plural bands from photographing data of each of the spectral images corresponding to the respective plural bands obtained by preliminary photographing which is performed prior to main photographing, determining photographing conditions for the respective plural bands based upon the calculated sensitivity balance among the respective plural bands, and causing the multi-band image photographing apparatus to perform the main photographing in accordance with the determined photographing conditions for the respective plural bands.

And, another of the programs comprises the steps of calculating an output value balance among the respective plural bands from photographing data of each of the spectral images corresponding to the respective plural bands obtained by preliminary photographing which is performed prior to main photographing, determining photographing conditions for the respective plural bands based upon the calculated output value balance among the respective plural bands, and converting the image output values obtained by performing the main photographing in accordance with the determined photographing conditions using a conversion table that is prepared in advance and has a proportional relation between the image output values of the photographed image and the effective exposure amounts upon photographing to output the obtained effective exposure amounts.

In addition, the other of the programs comprises the steps of calculating an output value balance among the respective plural bands from photographing data of each of the spectral images corresponding to the respective plural bands obtained by preliminary photographing which is performed prior to main photographing, and determining the photographing conditions for the main photographing in the respective plural bands based upon the calculated output value balance among the respective plural bands.

DETAILED DESCRIPTION OF THE PREFERRED EMBODIMENTS

A multi-band image photographing method and a multi-band image photographing apparatus, and a program for executing this method in accordance with the present invention will now be described in detail below based upon preferred embodiments shown in the accompanying drawings.

Figure 1:
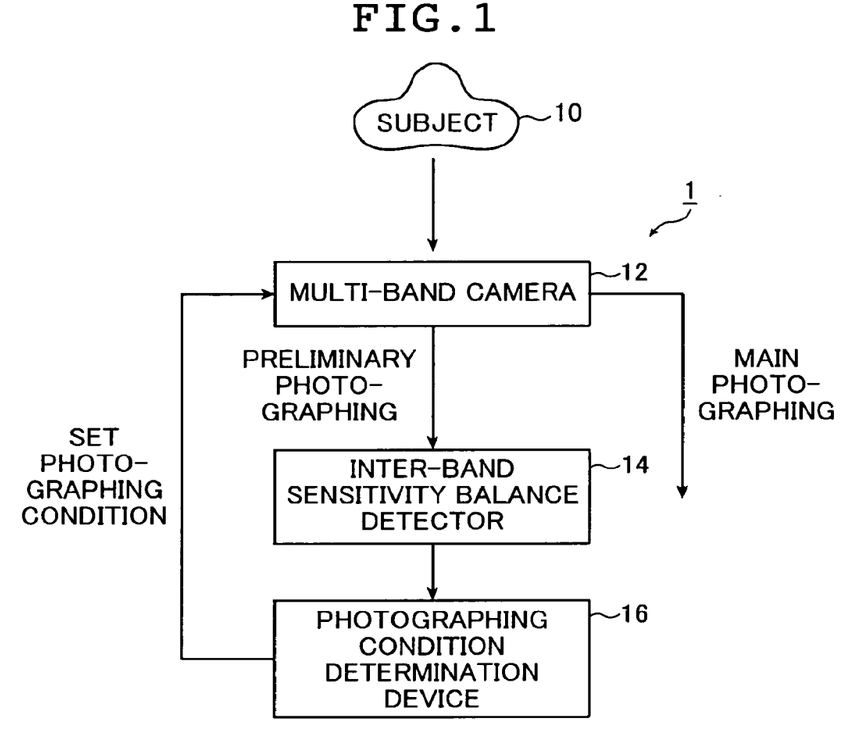
FIG. 1 is a block diagram schematically showing an embodiment of a multi-band image photographing apparatus implementing a multi-band image photographing method according to a first embodiment of the present invention.

FIG. 1 is a block diagram schematically showing an embodiment of a multi-band image photographing apparatus with which a multi-band image photographing method according to a first embodiment of the present invention is executed.

The multi-band image photographing apparatus of this embodiment includes first performing preliminary photographing of a subject, determining photographing conditions based upon the sensitivity balance among individual bands obtained by the preliminary photographing, and performing main photographing according to the determined photographing conditions.

As shown in FIG. 1, a multi-band image photographing apparatus 1 of this embodiment includes a multi-band camera 12 for photographing a subject 10 to capture multi-band image data, an inter-band sensitivity balance detector 14 for detecting the sensitivity balance among individual bands from photographing data obtained by preliminary photographing, and a photographing condition determination device 16 for determining photographing conditions based upon the detected sensitivity balance among the respective bands.

There is no particular limitation on the multi-band camera 12 used, as long as a plurality of spectral images corresponding to the respective bands (a multi-band image) can be obtained by photographing a subject in plural wavelength regions (in plural bands) through which plural kinds of light (not less than four in many cases) can pass.

For example, there is a multi-band camera which includes a photographing lens and a CCD sensor for photoelectrically reading an image of focused light, has plural (at least four) band pass filters arranged in front of the photographing lens, and is adapted to photograph a subject while sequentially changing the band pass filters from one to another. Instead of sequentially changing the band pass filters from one to another as described above, it is also preferable to use a liquid crystal tunable filter which can electrically change the spectral transmittance distribution.

The inter-band sensitivity balance detector 14 and the photographing condition determination device 16 are specifically included in a computer, and receive from the multi-band camera 12 multi-band image data obtained by photographing the subject 10 and performs predetermined processing to be described below on the received multi-band image data.

The inter-band sensitivity balance detector 14 detects (calculates) a ratio of an output value (obtained intensity) of each band (channel) obtained by photographing the subject 10 with respect to a maximum output value as the sensitivity balance among the respective bands.

The photographing condition determination device 16 determines photographing conditions based upon the sensitivity balance among the respective bands such that the sensitivity balance (the calculated ratios mentioned above) may fall within a predetermined range. Although not specifically limited, the photographing condition may include a method of adjusting photographing time (exposure time) in a low sensitivity band such that the sensitivity balance among the respective bands may fall within the predetermined range.

Figure 2:
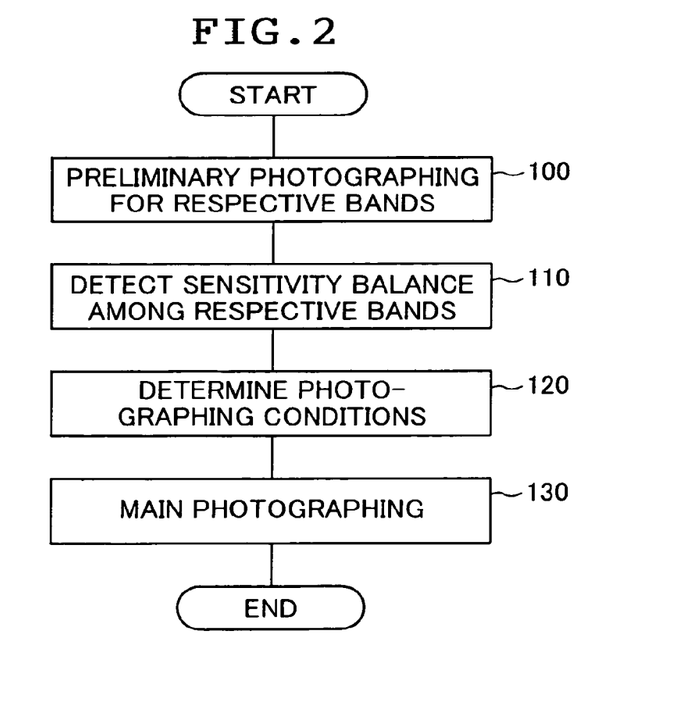
FIG. 2 is a flowchart showing a flow of processing in the multi-band image photographing method according to the first embodiment of the present invention.

FIG. 2 is a flowchart showing a flow of processing in the multi-band image photographing method of this embodiment.

The operation in this embodiment will be described in accordance with the flowchart shown in FIG. 2.

First, in step 100, the multi-band camera 12 is used to perform preliminary photographing (pre-exposure) of the subject 10 for each band, whereby an output value of each band is obtained for example from a reference white part in a subject image. Photographing data (output value of each band) obtained by the preliminary photographing is sent from the multi-band camera 12 to the inter-band sensitivity balance detector 14.

Next, in step 110, the inter-band sensitivity balance detector 14 detects (calculates) the sensitivity balance among the respective bands.

That is, when receiving the multi-band image data obtained by the preliminary photographing, the inter-band sensitivity balance detector 14 first compares output values of the respective bands to find a maximum value among them. Next, the inter-band sensitivity balance detector 14 calculates a ratio between the output value of each band and this maximum value (output value for each band/maximum value).

If this ratio (output value for each band/maximum value) is close to 1 in all the bands, it can be said that the respective bands have substantially equal sensitivity balance. However, if this ratio takes a small value in a band, the sensitivity of the band is low.

This embodiment aims at determining photographing conditions and performing main photographing under the determined photographing conditions to allow the sensitivity balance for each band to be substantially equal.

The calculated maximum value and the ratios of the output values of the respective bands (with respect to the maximum value) are sent to the photographing condition determination device 16.

Next, in step 120, the photographing condition determination device 16 determines photographing conditions for the main photographing based upon the sensitivity balance among the respective bands detected in step 110.

The photographing condition determination device 16 determines the photographing conditions such that the sensitivity balance among the respective bands calculated in step 110 may fall within a predetermined range. To be more specific, the device 16 determines the photographing conditions such that the ratios of the output values of the respective bands to the maximum value are all not less than the predetermined value (takes values close to 1).

There are various photographing conditions. An exemplary case in which the exposure amount adjustment is performed based on the photographing time (exposure time) will be described below.

Figure 3:
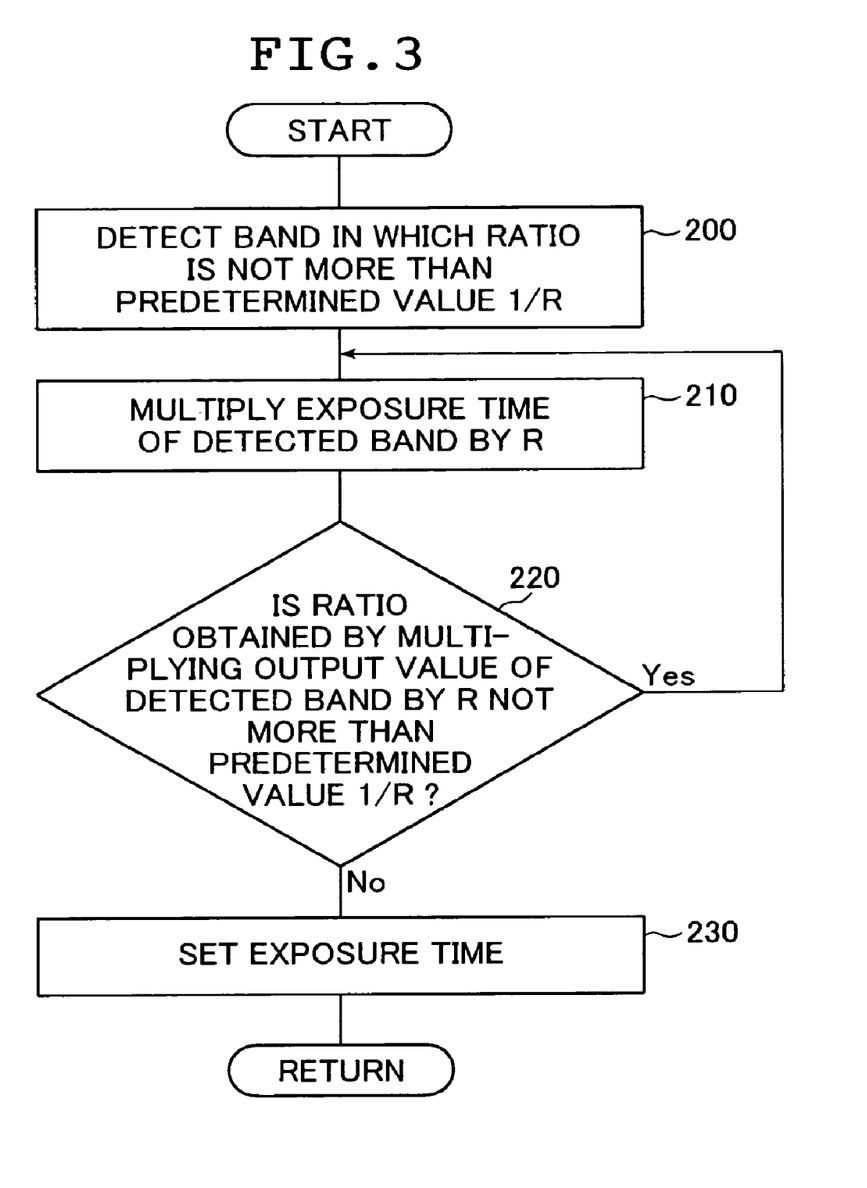
FIG. 3 is a flowchart showing an exemplary method of setting an exposure time as a photographing condition.

FIG. 3 is a flowchart showing an exemplary method of setting the exposure time as a photographing condition.

First, in step 200, the photographing condition determination device 16 detects a band in which the ratios of the output values of the respective bands to the maximum value (output values of the respective bands/maximum value) are not more than a predetermined value 1/R (where R is an appropriate integer, e.g., R=10).

In the band in which this ratio is not more than the predetermined value 1/R, the output value is smaller than the maximum value, and the sensitivity is lower than that in the band having the maximum output value. Thus, for the band with low sensitivity in which the ratio is not more than the predetermined value 1/R, the exposure time is made longer to compensate for the low sensitivity.

That is, in step 210, for the band detected as having a ratio of not more than the predetermined value 1/R, the exposure time is multiplied by R.

Next, in step 220, the output value of the detected band is multiplied by R to compare with the maximum value again. The ratio is newly calculated and the new ratio (new output value for the band obtained by multiplying by R/maximum value) is compared with the predetermined value 1/R.

As a result, if the ratio is still small even after the output value is multiplied by R and the exposure time is still insufficient, the process returns to step 210, where the exposure time (already multiplied by R) of the band is multiplied by R again.

This operation is repeated until the ratio exceeds the predetermined value 1/R to offer the satisfactory sensitivity balance among the bands.

As a result, if the ratio exceeds the predetermined value, the process proceeds to step 230, where the exposure time (multiplied by R several times) at that point is set as the exposure time of the band.

Referring to the flowchart shown in FIG. 2 again, when the photographing conditions are determined in step 120, the process proceeds to step 130, where the photographing condition (exposure time) determined in the previous step is set in the multi-band camera 12, so that photographing is performed in each band under this photographing condition to obtain a multi-band image.

Note that, the exposure time may be set through the uniform adjustment of the exposure time for all the bands based on an average determined from output values of the respective bands in the entire image. In this way, automatic exposure adjustment (AE) in the multi-band image photographing is attained.

In this way, according to this embodiment, in the multi-band image photographing, a natural image with a good S/N balance among the respective bands is capable of being photographed.

A more specific example will be described below.

EXAMPLE 1

A multi-band camera including a spectral filter unit, a CCD camera unit, and a computer in which software for controlling these units was incorporated was used as the multi-band camera 12.

The spectral filter unit is a liquid crystal tunable filter manufactured by CRI, Inc., Varispec Tunable Filter RS232C I/F. This is capable of arbitrarily selecting a central wavelength in a wavelength range of 400 to 720 nm and has a wavelength half-value width of 30 nm and a transmittance of 6 to 60% (depending upon the wavelength). In addition, the CCD camera is of monochrome type CA-D4-1024A PCI I/F manufactured by DALSA Corp. and is composed of 1024× 1024 pixels each of which has a size of 12×12 (μ). Further, the personal computer is a book type PC (Windows (registered trademark) 95) C++ manufactured by PROSIDE Corp. with a CPU of 166 MHz and a RAM of 128 Mbytes.

As to photographing conditions, a metal halide lamp with subject illuminance of 9600 lux was used as a light source and Nikomart (f=50 mm, F1.4) with F2.8 was used as a lens. In addition, ultraviolet and infrared cut filters were used to cut rays with wavelengths of 400 nm or less and 730 nm or more, respectively. In addition, a multi-band image is composed of 16 bands obtained by dividing the wavelength range of 410 to 710 nm by a wavelength interval of 20 nm.

Further, a Macbeth chart was used as the subject 10.

Under such conditions, first, preliminary photographing (pre-exposure) was performed with exposure for 25 msec in each band. Then, output values of the respective bands were obtained from a reference white part in the image (white part in six gray patches of the Macbeth chart).

Since output values from a reference white chart (whose spectral reflectance is already known) cannot be generally obtained, an output value of a brightest point (point where a sum of output values of the respective bands is largest) or an average value in terms of LATD in the image may be referred to.

Next, from among the output values obtained in the above process from the reference white part in the respective bands, a bund in which the ratio of the output value (obtained intensity) to the maximum value was a predetermined value 1/R (where R=10) was detected.

Then, the exposure time of the detected band was multiplied by R for setting. In this case, if the ratio of the output value multiplied by R with respect to the maximum value was still equal to or less than the predetermined value 1/R, this operation was repeated.

In this way, the exposure time was set and main photographing was performed under this condition. It can be said that setting the exposure time ratio of the each band in this way is equivalent to auto-white balance (AWB) in the multi-band image photographing.

Note that, in the setting of the exposure time, it is more preferable that the exposure time can be adjusted uniformly for all the bands by judging an average value of output values in the respective bands in the entire image in case of setting the exposure times for the respective bands in the above process.

As described above, in the photographing in which the ratio is set as R=10, an exposure time multiplied by ten is set in a band of 410 nm according to this method.

An image represented by CIELab values estimated from the photographed multi-band image was reproduced as a hardcopy image by PICTROGRAPHY 3000 manufactured by Fuji Photo Film Co., Ltd.

The image obtained had less noise in yellow/blue colors considered to be due to a short wave region than an image obtained without setting the exposure time and thus achieved improvement of image quality.

A second embodiment of the present invention will be described below.

The embodiment to be described below refers to the case where the effective exposure amount obtained in each band is detected in preliminary photographing and the photographing time of each band is adjusted so that the effective exposure amount obtained in each photographing band falls within a predetermined range, whereby the photographing condition is determined and main photographing is performed.

The effective exposure amount will be first described below.

The effective exposure amount obtained in each band through the photographing with a multi-band camera can be represented below. More specifically, the effective exposure amount EEVi of the ith band is represented by Equation (1):

$$EEVi = \alpha \cdot \int E(\lambda) \cdot \rho(\lambda) \cdot Si(\lambda) d\lambda \quad (1)$$

where $\lambda$ is a wavelength, $Si(\lambda)$ is a spectral sensitivity of the ith band, $\rho(\lambda)$ is a spectral reflectance of a subject, $E(\lambda)$ is a spectral distribution of a light source, and $\alpha$ is a constant of proportionality.

The effective exposure amount was represented on a time unit basis.

In the case of an achromatic color in which the spectral reflectance of a subject does not depend on the wavelength, $\rho(\lambda) = \rho$. Therefore, Equation (1) can be written by Equation (2) below:

$$EEVi = \alpha \cdot \rho \cdot \int E(\lambda) \cdot Si(\lambda) d\lambda \quad (2)$$

Further, when the reflectance of a subject is close to 1 as in a white chart, $\rho \approx 1$. Therefore, Equation (2) can be written by Equation (3) below:

$$EEVi \approx \alpha \cdot \int E(\lambda) \cdot Si(\lambda) d\lambda \quad (3)$$

In general, the output signal (O) from a camera has a functional relation with the effective exposure amount (EEV) of the camera that receives light and this function is very often represented by an exponential function. In other words, the output signal represented by the equation O=f(EEV) which is a function (f(EEV)) of the effective exposure amount EEV is proportional to the γth power of EEV.

In particular, the output signal from a camera is converted with a table to have an exponent γ of 1, so that the image signal acquired (output signal O) can be directly proportional to the effective exposure amount EEV as shown in Equation (4) below:

$$O = f(EEV) \propto EEV \quad (4)$$

As is seen from Equation (4), an image signal representing the effective exposure amount EEV can be obtained by subjecting the output signal O from a camera to a table conversion $f^{-1}$ which is an inverse transform of f. In other words, the relation is schematically written as follows:

Output signal from camera→Table conversion $f^{-1}$→Image signal

In the embodiment to be described below, such a means is provided so that image data acquired in each band of a multi-band camera is proportional to the effective exposure amount.

The relation of Equation (4) above can also be obtained by adjusting the exponent $\gamma$ to be 1 by the use of a camera having a capability to adjust the exponent $\gamma$.

In general, the S/N ratio of an image pickup system is a function of the amount of light (effective exposure amount in this embodiment) obtained by photographing. In this function, the S/N ratio is increased along with the increase of the effective exposure amount (modeling with a square function of the effective exposure amount is also possible).

From the above, in order to obtain images with the S/N ratios of the respective bands being close to each other, the effective exposure amount obtained in each band need only be controlled to fall within a specified range when a subject such as a reference white board whose spectral reflectance is substantially constant is photographed with a multi-band camera. Further, signal values obtained from the multi-band camera need only be controlled to fall within a specified range.

It can be also said that, under a light source which have substantially the same properties in the wavelength direction in the energy spectral distribution, this control is consequently made to make the sensitivity balance uniform among the bands of the camera. Under a light source such as a fluorescent lamp whose properties in the wavelength direction greatly changes in the energy spectral distribution, the balance with respect to the total effective exposure amounts is controlled among the bands.

The above description was made on a time unit basis, but taking the time dimension into consideration, the effective exposure amount obtained at the time of photographing in each band is represented as an integral of EEVi in Equations (1), (2) and (3) over the photographing time $\Delta T$ or a product of EEVi and the photographing time $\Delta T$. The effective exposure amount can be thus adjusted by the adjustment of the photographing time $\Delta T_i$ of each band.

Figure 4:
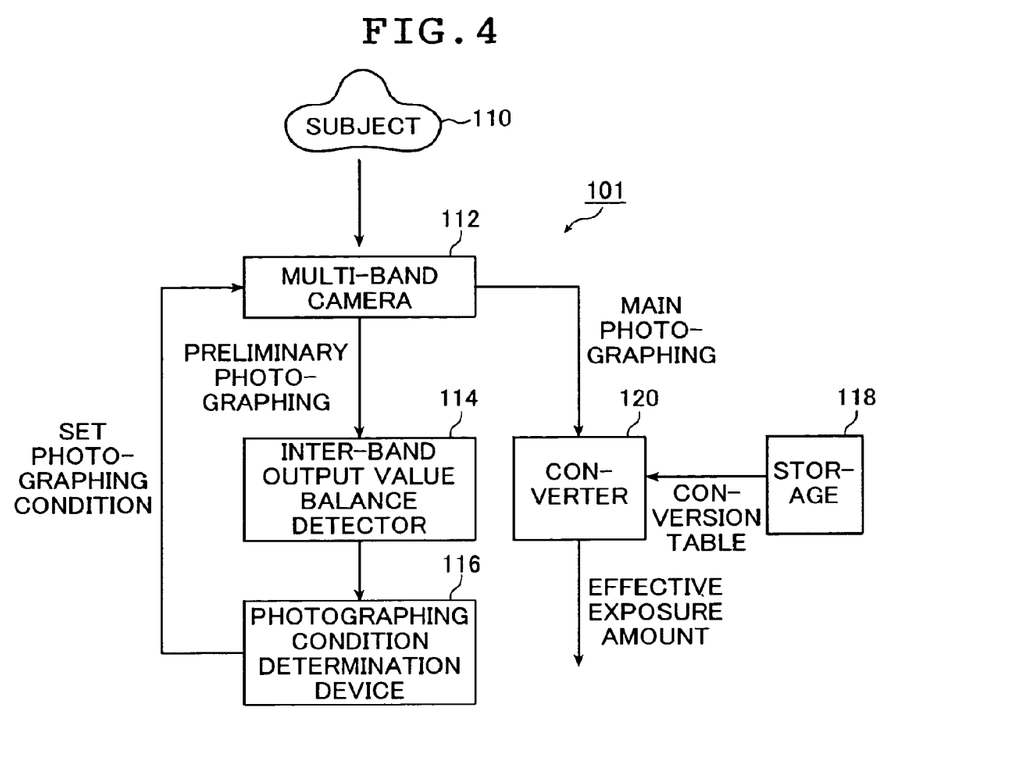
FIG. 4 is a block diagram schematically showing another embodiment of the multi-band image photographing apparatus implementing the multi-band image photographing method according to a second embodiment of the present invention.

FIG. 4 is a block diagram schematically showing another embodiment of the multi-band image photographing apparatus implementing the multi-band image photographing method according to the embodiment of the present invention.

As shown in FIG. 4, a multi-band image photographing apparatus 101 of this embodiment includes a multi-band camera 112 for photographing a subject 110 to capture multi-band image data, an inter-band output value balance detector 114 for detecting the output value balance among individual bands from photographing data obtained by preliminary photographing, a photographing condition determination device 116 for determining photographing conditions based upon the detected output value balance among the respective bands, a storage 118 for storing a conversion table having a proportional relation between image output value and effective exposure amount, and a converter 120 for converting the image output value obtained by main photographing to the effective exposure amount using the conversion table.

The multi-band camera 112 is similar to the camera used in the first embodiment and is not limited in any particular way.

The inter-band output value balance detector 114, the photographing condition determination device 116, the storage 118 and the converter 120 are specifically included in a computer.

The inter-band output value balance detector 114 detects ratios 1/Ri of output values of the respective bands (channels) with respect to the maximum value among the output values of the respective bands obtained by photographing reference white included in the subject 110.

For the setting, the photographing condition determination device 116 sets Ri times as long as the exposure time of the channel in which the output value is the maximum value as the exposure time of each channel in which the detected ratio is 1/Ri.

The storage 118 stores a previously prepared conversion table which has a proportional relation between the image output value and the effective exposure amount. The converter 120 uses the conversion table to convert the image output value obtained by performing main photographing under the photographing condition determined in the previous process into the effective exposure amount.

The operation in this embodiment will be described below in accordance with the flowchart shown in FIG. 5.

First, in step 300, a conversion table between image output value and effective exposure amount which has a proportional relation between the image output value and the effective exposure amount is prepared in advance and stored in the storage 118.

Then, in step 310, the multi-band camera 112 is used to perform preliminary photographing of the subject 110 for each band, thereby obtaining, for example, an output value of each band from a reference white part of the subject 110. The photographing data obtained by the preliminary photographing (output value of each band) is sent from the multi-band camera 112 to the inter-band output value balance detector 114.

Then, in step 320, the inter-band output value balance detector 114 detects the output value balance among the respective bands. When receiving a multi-band image obtained by the preliminary photographing, the inter-band output value balance detector 114 detects a band in which the output value from among the output values in the respective bands in the reference white part of the subject 110 is a maximum value and calculates a ratio 1/Ri of an output value of each band with respect to the maximum value.

Then, in step 330, the photographing condition determination device 116 determines photographing conditions of the main photographing. When the ratio of the output value of each band to the band which has a maximum output value is 1/Ri, it is determined that the exposure time of this band (channel) is Ri times as long as that of the band which has the maximum output value.

The thus determined exposure time is set in the multi-band camera 112 and the main photographing is thus performed in next step 340.

In step 350, the image output value obtained by the main photographing is sent to the converter 120, where the image output value is converted into the effective exposure amount using the conversion table between image output value and effective exposure amount as stored in the storage 118.

In the processing system including the conversion table between image output value and effective exposure amount as in this embodiment, control of the image output value directly leads to control of the effective exposure amount and direct control is thus possible.

A more specific example will be described below.

EXAMPLE 2

Figure 6A:
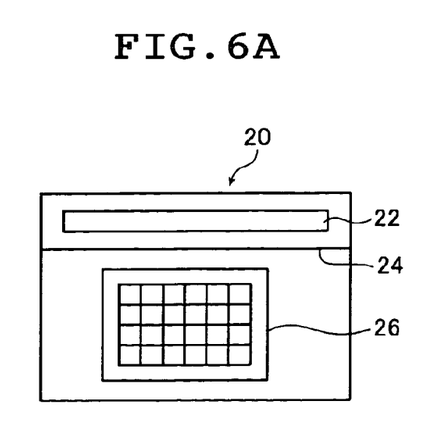
FIGS. 6A and 6B are a front view and a side view of an experimental illumination booth for use in Examples 2 and 3, respectively.
Figure 6B:
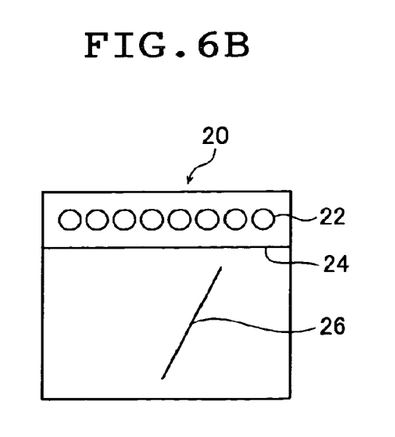

Prior to actually starting this example, an experimental illumination booth 20 as shown in FIGS. 6A and 6B was prepared. FIGS. 6A and 6B are a front view and a side view of the booth 20, respectively. As shown, fluorescent lamps 22 were arranged parallel to each other in the upper part inside of the booth 20 and a diffuser plate 24 was placed under the fluorescent lamps 22. A subject 26 was placed obliquely in the lower part of the booth 20 so that the subject 26 illuminated from the above by the fluorescent lamps 22 through the diffuser plate 24 can be photographed from the front.

A multi-band camera similar to the one used in Example 1 including a spectral filter unit, a CCD camera unit and a computer in which software for controlling these units was incorporated was used as the multi-band camera 112.

We now refer to the photographing conditions. For the light source used in Example 2, eight fluorescent lamps, color rendering improved type N-DSL from Toshiba were arranged in the illumination booth 20 as shown in FIG. 6B. The illuminance of the subject was 3000 lux.

The other photographing conditions were similar to those in Example 1 as described above. A multi-band image was formed of 16 bands and a Macbeth chart was used for the subject.

Figure 5:
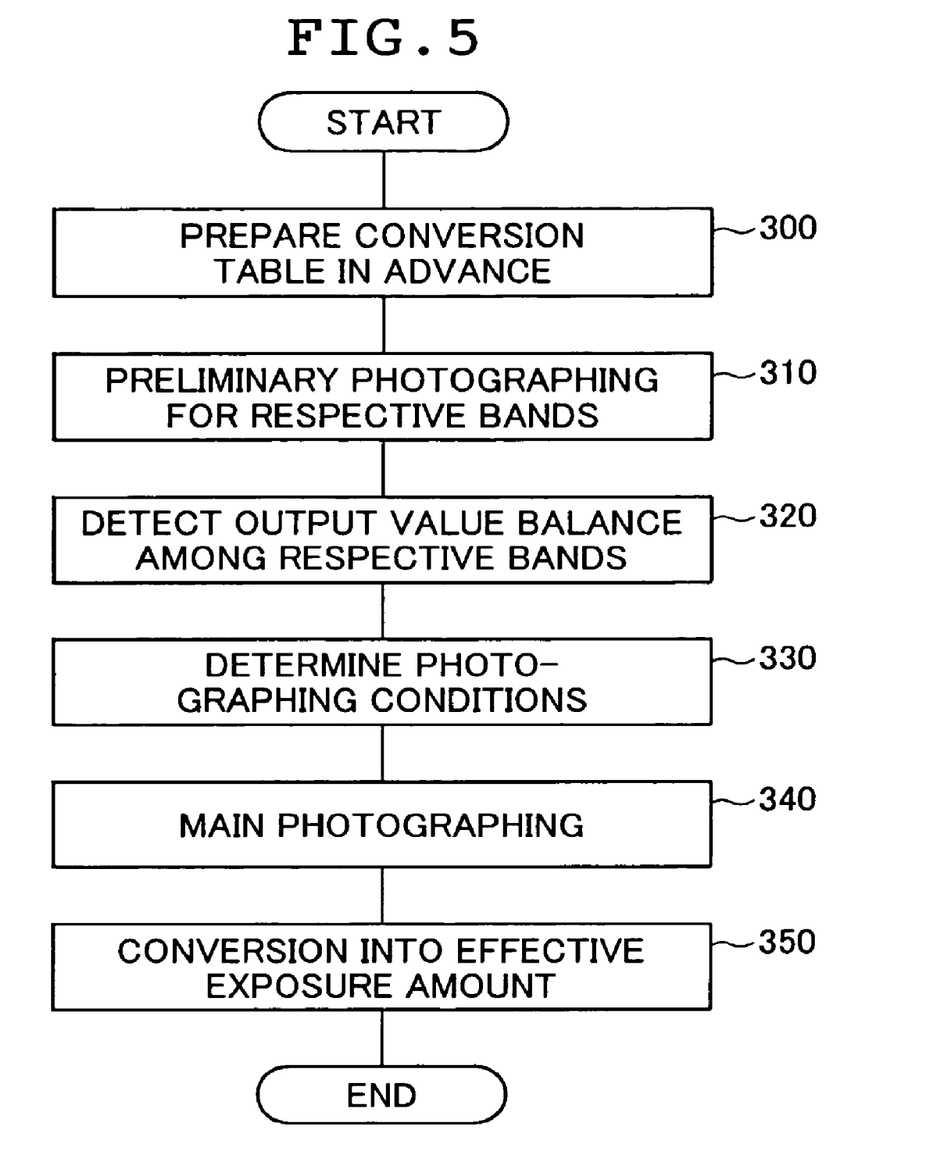
FIG. 5 is a flowchart showing a flow of processing in the multi-band image photographing method according to the second embodiment of the present invention.

Photographing was performed in accordance with the flowchart shown in FIG. 5.

To be more specific, a conversion table between image output value and effective exposure amount was prepared in advance and preliminary photographing was performed through exposure for 100 msec in each band, whereby output values of the respective bands were obtained from reference white in the image (white portion of six gray patches in Macbeth Color Checker).

Since the output value obtained is not generally from a reference white chart (with known spectral reflectance), an output value of a brightest point (point where a sum of output values of the respective channels is largest) or an average value in terms of LATD in the image may be referred to.

The ratios 1/Ri of output values of the respective bands with respect to a maximum value of a band in which an output value among the output values (obtained intensity) of the respective bands obtained by the preliminary photographing of the reference white part was the maximum value were calculated. In the respective channels, the exposure time for the maximum output value was multiplied by Ri as the exposure time for the each channel, and the thus obtained value was set as the photographing time (exposure time) of each channel and main photographing was performed based on the thus set exposure time.

The conversion table prepared in advance was used to convert the image output value obtained by the main photographing into the effective exposure amount.

In this way, in the multi-band image photographing, a natural image with a good S/N balance among the respective bands can be photographed.

A third embodiment of the present invention will be described below.

This embodiment is directed to the case where the effective exposure amount is adjusted to fall within a specified range by the repetitive control using a magnitude relation of output values among bands, although the physical quantity relation between image output value and effective exposure amount is nonlinear when there is no conversion table between image output value and effective exposure amount as in the above-mentioned second embodiment.

In some cases, $\gamma$ in an ordinary camera is set to be a reciprocal number to the 2.2th power of $\gamma$ in a monitor. For example, the output value Oi and the effective exposure amount EEVi have a relation as shown by Equation (5) below:

$$Oi = 255 \cdot ((EEVi - 0.001)/0.999)^{0.45} \tag{5}$$

Therefore, when the values among the bands are directly reflected, excessive compensation is not performed (the compensation is performed on the underexposure side).

Figure 7:
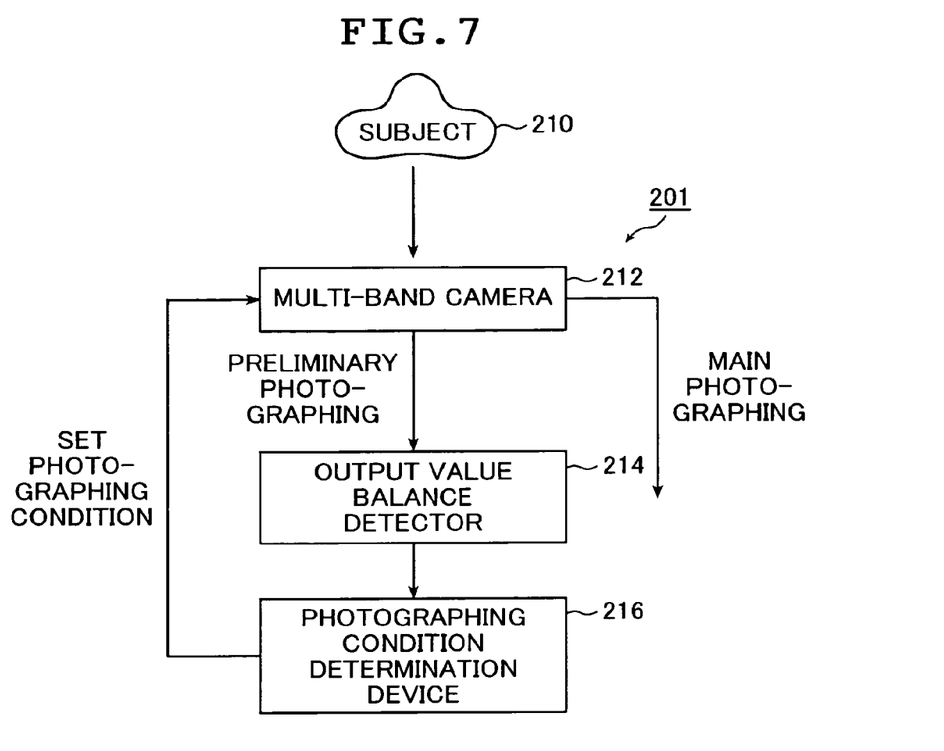
FIG. 7 is a block diagram schematically showing still another embodiment of the multi-band image photographing apparatus implementing the multi-band image photographing method according to a third embodiment of the present invention.

FIG. 7 is a block diagram schematically showing still another embodiment of the multi-band image photographing apparatus implementing the multi-band image photographing method according to the third embodiment of the present invention.

As shown in FIG. 7, a multi-band image photographing apparatus 201 of this embodiment includes a multi-band camera 212 for photographing a subject 210 to capture multi-band image data, an inter-band output value balance detector 214 for detecting the output value balance among individual bands from photographing data obtained by preliminary photographing, and a photographing condition determination device 216 for determining photographing conditions based upon the detected output value balance among the respective bands.

The multi-band camera 212 is similar to the camera used in the first embodiment and is not limited in any particular way.

The inter-band output value balance detector 214 and the photographing condition determination device 216 are specifically included in a computer.

The inter-band output value balance detector 114 detects ratios 1/Ri of output values of the respective bands (channels) with respect to the maximum value among the output values of the respective bands obtained by photographing reference white included in the subject 110.

The inter-band output value balance detector 214 detects ratios 1/Ri of output values of the respective bands (channels) with respect to the maximum value among the output values of the respective bands obtained by photographing reference white included in the subject 210.

For the setting, the photographing condition determination device 216 sets Ri times as long as the exposure time of the channel in which the output value is the maximum value as the exposure time of each channel in which the detected ratio is 1/Ri.

The operation in this embodiment will be described below in accordance with the flowchart shown in FIG. 8.

First, in step 500, the multi-band camera 212 is used to perform preliminary photographing of the subject 210 for each band, thereby obtaining, for example, an output value of each band from a reference white part of the subject 210. The photographing data obtained by the preliminary photographing (output value of each band) is sent from the multi-band camera 112 to the inter-band output value balance detector 114.

Then, in step 510, the inter-band output value balance detector 214 detects the output value balance among the respective bands. When receiving a multi-band image obtained by the preliminary photographing, the inter-band output value balance detector 214 detects a band in which the output value of each band from the reference white part of the subject 210 is a maximum value and calculates a ratio 1/Ri of an output value of each band with respect to the maximum value.

Then, in step 520, the photographing condition determination device 216 determines photographing conditions of the main photographing. Since this embodiment has no conversion table between image output value and effective exposure amount as described above, the photographing conditions are determined by the repetitive control. The repetitive control is performed along the flow similar to that of the flowchart shown in FIG. 3 in connection with the first embodiment described above.

In other words, the ratio of the output value (obtained intensity) of each channel obtained from the reference white part of the subject by the preliminary photographing with respect to the maximum value is calculated and a channel whose calculated ratio is not more than a predetermined ratio 1/Ri is detected. The exposure time of the detected channel is multiplied by Ri for the setting. The preliminary photographing is performed again based on the exposure time obtained by the multiplication by Ri. The exposure time is repeatedly multiplied by Ri and the preliminary photographing is repeated until the output value ratio obtained is larger than the predetermined ratio 1/Ri. This operation is performed until each channel fulfills this requirement. The exposure time is thus determined.

The thus determined exposure time is set in the multi-band camera 212 and the main photographing is performed based on the set exposure time.

The exposure time may be set based on the average of the output values of the respective bands in the entire image to enable uniform adjustment of the exposure time for each band.

A more specific example will be described below.

EXAMPLE 3

An experimental illumination booth 20 as shown in FIGS. 6A and 6B was also used when actually implementing this example.

A multi-band camera similar to the one used in Example 1 including a spectral filter unit, a CCD camera unit and a computer in which software for controlling these units was incorporated was used as the multi-band camera 212.

We now refer to the photographing conditions. The light source was similar to the one used in Example 2, and eight fluorescent lamps, color rendering improved type N-DSL from Toshiba were arranged in the experimental illumination booth 20 as shown in FIG. 6B. The illuminance of the subject was 3000 lux.

The other photographing conditions were similar to those in Example 1 as described above. A multi-band image was formed of 16 bands and a Macbeth chart was used for the subject.

Figure 8:
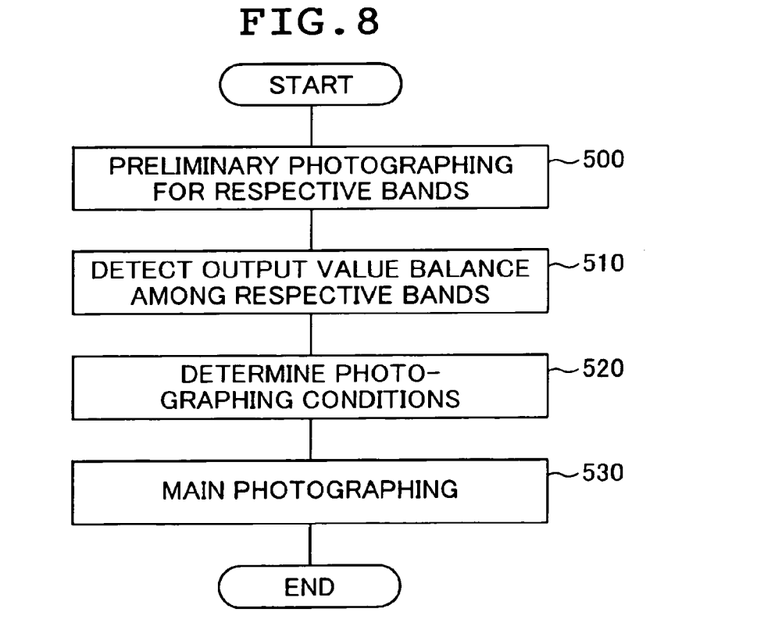
FIG. 8 is a flowchart showing a flow of processing in the multi-band image photographing method according to the third embodiment of the present invention.

Photographing was first performed in the same way as described using the flowchart shown in FIG. 8.

To be more specific, preliminary photographing was first performed using the photographing time of 100 msec for each band to obtain an output value of each band from a reference white part of an image (white portion of six gray patches in Macbeth Color Checker).

The ratio of the output value (obtained intensity) of each band (channel) obtained from the reference white part with respect to the maximum value is calculated and a band whose calculated ratio is not more than a predetermined ratio 1/R is detected. The exposure time of the detected band is multiplied by R for the setting. The preliminary photographing is performed again based on the thus set exposure time. This operation is repeatedly performed until the ratio calculated between the newly obtained output value and the maximum value is larger than the predetermined ratio 1/R.

The main photographing was performed based on the thus set photographing time.

In this example, it became possible to adjust the effective exposure amount within a specified range by the repetitive control using a magnitude relation of output values among bands, although there is no conversion table between image output value and effective exposure amount.

The image obtained in each example had less noise in yellow/blue colors considered to be due to the short wave region than an image obtained without setting the exposure time as described above and thus achieved improvement of image quality. In addition, noise in red color due to the long wave region can be also reduced.

In addition, if software for causing a computer or the like to execute the above-described multi-band image photographing method or the step forming a part of this method, for example, exposure amount determination method or method for calculating the effective exposure amount is incorporated in a program, the program can be installed in a computer for controlling a multi-band camera or any other computer to perform automatic photographing by the multi-band camera according to the multi-band image photographing method of the invention using the multi-band camera in combination with the computer for controlling the multi-band camera or any other computer. Alternatively, the exposure amount determined or the effective exposure amount calculated by any computer can be used to execute the multi-band image photographing method of the present invention with ease.

As described above, according to the present invention, even in the multi-band image photographing, it becomes possible to perform natural image photographing with a good S/N balance among individual bands.

The multi-band image photographing method and apparatus, and the program for executing this method according to the present invention have been described above in detail. However, it goes without saying that the present invention is not limited to the above-mentioned embodiments, and various improvements and modifications may be made without departing from the gist of the present invention.

What is claimed is:

1. A multi-band image photographing method of photographing a subject by dividing a photographing wavelength region into plural bands and obtaining spectral images of said subject corresponding to respective divided plural bands, comprising the steps of:

detecting a sensitivity balance among said respective divided plural bands from photographing data of each of said spectral images of said subject corresponding to said respective divided plural bands obtained by preliminary photographing of said subject which is performed prior to main photographing of said subject;

determining photographing conditions for said respective divided plural bands based upon said detected sensitivity balance among said respective divided plural bands; and performing said main photographing of said subject in accordance with said determined photographing conditions for said respective divided plural bands to photograph a multi-band image of said subject having said spectral images for said respective divided plural bands.

2. The multi-band image photographing method according to claim 1, wherein, as said photographing conditions, respective exposure times for adjusting exposure amounts for said respective divided plural bands are determined.

3. A multi-band image photographing apparatus comprising:

photographing means for photographing a subject by dividing a photographing wavelength region into plural bands and obtaining spectral images of said subject corresponding to respective divided plural bands;

sensitivity balance detection means for detecting a sensitivity balance among said respective divided plural bands from photographing data for said respective divided plural bands obtained by preliminary photographing of said subject which is performed prior to main photographing of said subject by said photographing means; and photographing condition determination means for determining photographing conditions based upon said sensitivity balance among said respective divided plural bands detected by said sensitivity balance detection means, wherein said photographing means performs said main photographing of said subject in accordance with said determined photographing conditions for said respective divided plural bands to photograph a multi-band image of said subject having said spectral images for said respective divided plural bands.

4. The multi-band image photographing apparatus according to claim 3, wherein said sensitivity balance among said respective divided plural bands is detected by said sensitivity balance detection means from said photographing data of said spectral images corresponding to said respective divided plural bands obtained by the preliminary photographing which is performed by said photographing means prior to the main photographing, said photographing conditions for said respective divided plural bands are determined by said photographing condition determination means based upon said detected sensitivity balance among said respective divided plural bands, and said main photographing of said subject is performed by said photographing means in accordance with said determined photographing conditions for said respective divided plural bands to photograph said multi-band image of said subject having said spectral images for said respective divided plural bands.

5. The multi-band image photographing apparatus according to claim 3, wherein said photographing condition determination means determines respective exposure times for adjusting exposure amounts for said respective divided plural bands.

6. A computer-readable medium or memory encoding a program for causing a computer to execute a method of determining photographing conditions for respective plural bands in order to perform a multi-band image photographing method of photographing a subject by dividing a photographing wavelength region into the respective plural bands and obtaining spectral images of said subject corresponding to said respective divided plural bands, comprising the steps of:

calculating a sensitivity balance among said respective divided plural bands from photographing data of each of said spectral images of said subject corresponding to said respective divided plural bands obtained by preliminary photographing of said subject which is performed prior to main photographing of said subject; and determining the photographing conditions for said main photographing in said respective divided plural bands based upon said calculated sensitivity balance among said respective divided plural bands, wherein said main photographing of said subject is performed in accordance with said determined photographing conditions for said respective divided plural bands to photograph a multi-band image of said subject having said spectral images for said respective divided plural bands.

7. The computer-readable medium or memory according to claim 6, wherein, as said photographing conditions, exposure times for adjusting exposure amounts for said respective divided plural bands are determined.

8. The multi-band image photographing method according to claim 1, wherein a liquid crystal tunable filter is used to change spectral transmittance distribution to determine the sensitivity balance.

9. The multi-band image photographing method according to claim 1, wherein the preliminary photography and the main photography is of the same subject.

10. The method of claim 1, wherein the detecting of the sensitivity balance is dynamically performed.

11. The method of claim 10, wherein a spectral sensitivity is determined for each plural band individually.

12. The method of claim 11, wherein the sensitivity balance is determined relative to a referenced white part of the subject.

* * * * *